May 24, 1960 B. J. E. LEBOCEY 2,938,155
STEP-BY-STEP MOTOR DRIVE FOR CIRCULAR KNITTING MACHINE
Filed July 23, 1954 2 Sheets-Sheet 1

INVENTOR.
BERNARD JULES ERNEST LEBOCEY
BY
ATTORNEY

INVENTOR.
BERNARD JULES ERNEST LEBOCEY
BY
Harold B. Hood
ATTORNEY

United States Patent Office
2,938,155
Patented May 24, 1960

2,938,155

STEP-BY-STEP MOTOR DRIVE FOR CIRCULAR KNITTING MACHINE

Bernard Jules Ernest Lebocey, Troyes, France, assignor to Daniel I. Glossbrenner, Oaklandon, Ind.

Filed July 23, 1954, Ser. No. 445,396

Claims priority, application France Jan. 14, 1954

5 Claims. (Cl. 318—443)

The present invention relates to a step-by-step drive for a machine of such character that, when a suitable control handle is moved to a predetermined position, driving means for the machine will be rendered effective to drive the machine and then will be promptly and automatically rendered ineffective to drive the machine; so that, in response to such a movement of the control handle, the machine will be indexed forward to a very slight degree. The control of the present invention is particularly useful in a circular knitting machine in which regulation, adjustment or repair sometimes requires rather delicate motions of the machine in order to bring a part to be adjusted, repaired or replaced into an accessible position; and the invention has therefore been illustrated, and will be described, in such an environment, though it will be recognized that the invention may find utility, as well, in radically different kinds of machines.

The primary object of the invention, then, is to provide a control system through which, in response to movement of a manually-manipulable element to a predetermined position, driving means for the machine will be rendered effective to drive the machine and then, without further manipulation of the manually-manipulable element, the driving means will automatically be rendered ineffective to drive the machine, so that the machine will be indexed forward through a very short integer of its normal cycle in response to each such movement of the manually-manipulable element.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
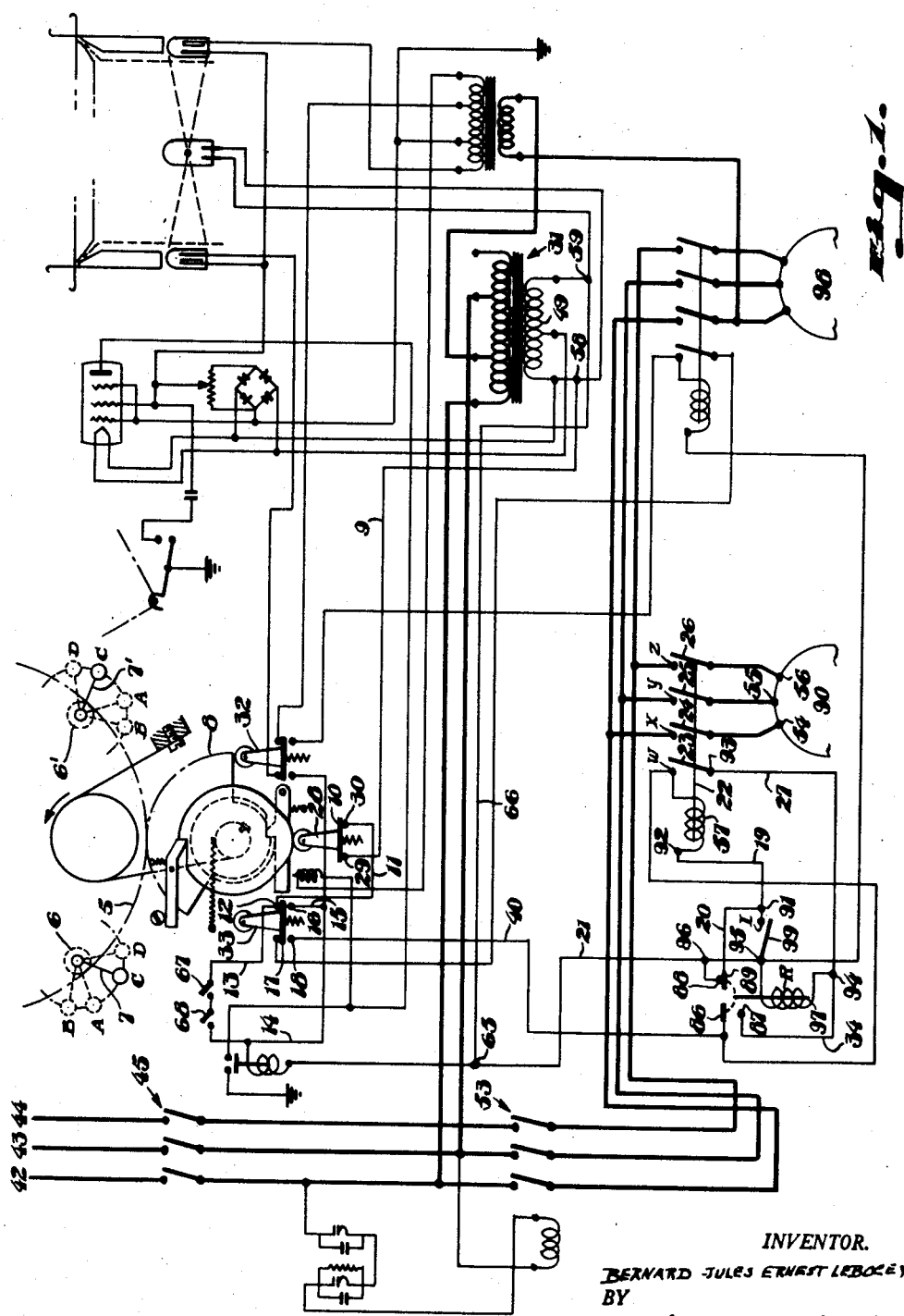
Fig. 1 is a diagrammatic illustration of a known form of control for a circular knitting machine, modified by the introduction thereinto of certain auxiliary units effective to accomplish the stated functions of the present invention.

The copending application of Marcel Lafeuillade, Serial No. 284,491, filed April 26, 1952, for Circular Single or Multi-Needle Bed Knitting Machines (now Patent 2,694,305, issued November 16, 1954), discloses a control system for, for instance, tubular knitting machines, involving a plurality of manually-manipulable control handles, as suggested at 7, 7' in Fig. 1, arranged at convenient intervals about the periphery of a knitting machine, each such handle being connected to turn a sprocket 6 or 6' operatively engaging a common chain 5 which also operatively engages a toothed segment 8 mounted for oscillation about a suitable axis. Said segment 8 is arranged and designed to engage, alternatively upon oscillation in opposite directions from its illustrated position, two plungers 32 and 33, each forming an element of a switch. It will be obvious that if any one of the control handles 7, 7', etc. is shifted from its solid line position C to its dotted line position D, the plunger 32 will be depressed; and that, if any one of those handles is shifted to its dotted line position B, the plunger 33 will be depressed. As is explained in the said copending application, the handle position C is a brake-setting position, position B is a slow running-position, position A is a machine-stopping position, and position D is a fast-running position. The present improvement upon the control of the said copending application is concerned solely with the circuits which are established upon movement of the handle 7, 7', etc. to the position B.

A source of electrical energy is indicated by the 3-phase line 42, 43, 44, which is controlled by the usual manual switch 45, a further switch 53, with suitable control therefor, being interposed in the line ahead of the slow-driving motor 90 and the fast-driving motor 98. The primary coil of a transformer 31 is connected across the wires 42, 43 between the switches 45 and 53 so that whenever the switch 45 is closed, the transformer 31 will be energized. The secondary coil 49 of the transformer 31 supplies power to the control circuits with which the present invention is concerned.

A wire 9 leads from one end 58 of the transformer secondary coil 49 to one terminal 29 of a suitably controlled switch 28 whose bridge piece 10 normally establishes electrical contact between the terminals 29 and 30. A wire 11 leads from terminal 30 to terminal 12 of the switch which includes the plunger 33. From the terminal 12, a wire 13 leads to switches 67 and 68, from which a wire 14 and a wire 15 lead to a further terminal 16 of the switch including the plunger 33. When the plunger 33 is depressed, its bridge piece 17 establishes electrical contact between terminals 16 and 18. A wire 40 leads from switch terminal 18 to one end w of the coil 57 of a switch-actuating relay. From the other end of said coil, a wire 19 leads to a point 91, whence a wire 20 extends to one contact point 89 carried upon the core 97 of an electro-magnetic switch including a coil R. The electromagnetic switch is so constructed and arranged that the contact point 89 normally engages a contact 88 which is connected, at 96, to a wire 21. A wire 66, connected to wire 21 at 65, leads to the other end 59 of the secondary coil 49.

Thus, when the handle 7, 7', etc. is moved to position B, at a time when the switch 45 is closed, the bridge piece 17 of the plunger 33 closes an energizing circuit for the relay coil 57 which extends from the end 58 of the coil 49 through wire 9, terminal 29, bridge piece 10, terminal 30, wire 11, terminal 12, wire 13, closed switches 67 and 68, wire 14, wire 15, terminal 16, bridge piece 17, terminal 18, wire 40, terminal w, coil 57, terminal 92, wire 19, terminal 91, wire 20, contact point 89, contact 88, connection 96, wire 21, connection 65 and wire 66 to the other end 59 of the coil 49.

Figure 2:
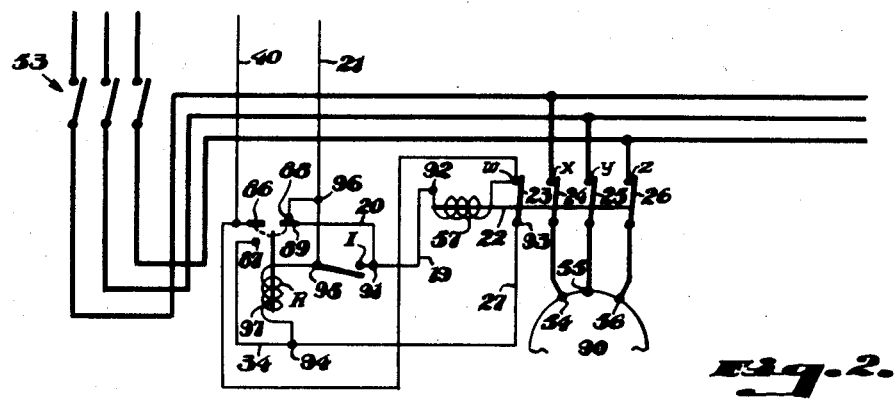
Fig. 2 is a fragmentary diagram of the parts of the system of Fig. 1 directly affected by the present invention, in the positions which they initially assume upon movement of the manually-manipulable element to a predetermined position.

Energization of the relay coil 57 attracts the core 22 of said relay; and, said core being mechanically connected to switch arms 23, 24, 25 and 26, said switch arms are moved into electrical contact with points w, x, y and z. This condition of the parts is illustrated in Fig. 2.

If, at this time, the switch 53 is closed, terminals 54, 55 and 56 of the slow-speed motor 90 will thereby be connected to the power source, and the motor 90 will be energized to drive the machine at slow speed.

A wire 27 leads from the end 93 of the switch arm 23 to a point 94 at one end of the coil R of the electromagnetic switch; and the other end of said coil is connected at 95 to the wire 21. Thus, when switch arm 23 is moved into engagement with contact w, an energizing circuit for the coil R is established from end 58 of transformer coil 49 through wire 9, terminal 29, bridge piece 10, terminal 30, wire 11, terminal 12, wire 13, closed switches 67 and 68, wire 14, wire 15, terminal 16, bridge piece 17, terminal 18, wire 40, contact w, switch arm 23, terminal 93, wire 27, coil R, connection 95, wire 21, connection 65 and wire 66 to the end 59 of transformer coil 49.

Energization of the coil R draws the core 97 thereof downwardly against the tendency of a biasing spring (not shown) to move the contact point 86, carried upon said core, into engagement with contact 87 and to move the contact point 89 out of engagement with contact 88. Thus, the energizing circuit for the coil 57 is broken at 88—89, while a holding circuit for the coil R is established from end 58 of transformer coil 49 through wire 9, terminal 29, bridge piece 10, terminal 30, wire 11, terminal 12, wire 13, switches 67 and 68, wire 14, wire 15, terminal 16, bridge piece 17, terminal 18, wire 40, contact point 86, contact 87, wire 34, connection 94, coil R, connection 95, wire 21, connection 65 and wire 66 to end 59 of transformer coil 49. This condition is illustrated in Fig. 3.

Figure 4:
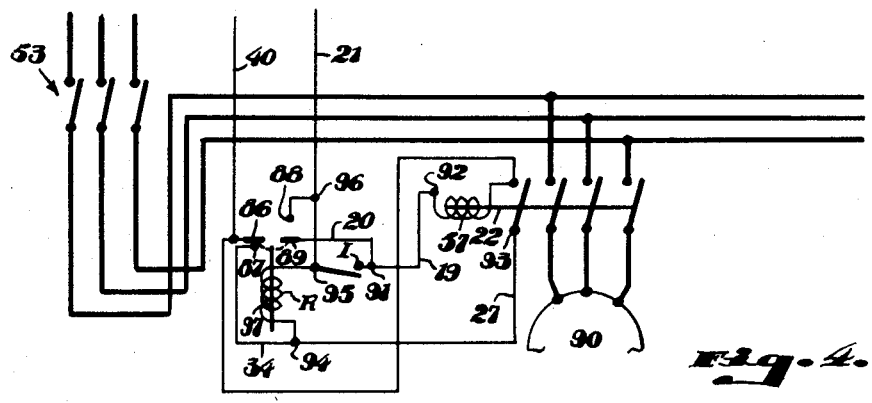
Fig. 4 is a similar fragmentary diagram showing the parts in the positions which they assume to render the driving means ineffective to drive the machine.

Upon such deenergization of the coil 57, the switch arms 23, 24, 25 and 26 are returned, by a biasing spring (not shown) to circuit-open positions, whereby the motor 90 will be stopped; but the core 97 will be held in its retracted position for so long as the coil R remains energized through the holding circuit above described. This condition of the parts is illustrated in Fig. 4.

Figure 3:
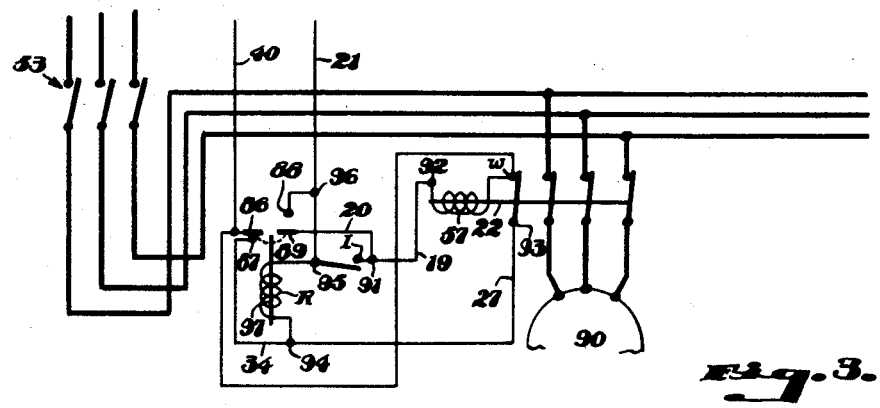
Fig. 3 is a similar fragmentary diagram showing the parts in the positions which they next assume.

Thus, it will be seen that, by simple movement of the control handle 7, 7', etc. to position B, the motor 90 will be momentarily energized, and then will be almost immediately deenergized, just as soon as the core 97 can move from the position of Fig. 1 to the position of Fig. 3, whereby the machine driven by the motor 90 will be indexed forward to a very slight degree, without further manipulation of the handle 7, 7', etc.

As soon as the control handle 7 is moved away from position B, to withdraw the segment 8 from depressing engagement with the plunger 33, said plunger will be elevated, by the illustrated spring or equivalent biasing means, to lift the bridge piece 17 out of engagement with the terminals 16 and 18, thus breaking the holding circuit for the coil R and returning the parts to the positions illustrated in Fig. 1. Thereupon, if the handle is again moved to position B, the above-described cycle will recur to index the machine forward through a further, very short step; and this cycle will be repeated as frequently as the handle 7 is withdrawn from, and returned to, position B.

A switch contact I is electrically connected to point 91, and a switch arm 99, electrically connected to wire 21 at 95, is movable into and out of engagement with the point I. It will be seen that closure of the switch arm 99 upon the switch point I will establish an energizing circuit for the coil 57 which is parallel with, and by-passes, the circuit which extends through points 88 and 89. Thus, when the switch arm 99 is so moved, depression of the plunger 33 will establish an energizing circuit for the coil 57 which extends from the end 58 of the transformer coil 49 through wire 9, terminal 29, bridge piece 10, terminal 30, wire 11, terminal 12, wire 13, closed switches 67 and 68, wire 14, wire 15, terminal 16, bridge piece 17, terminal 18, wire 40, terminal w, coil 57, terminal 92, wire 19, switch point I, switch arm 99, connection 95, wire 21, connection 65 and wire 66 to end 59 of transformer coil 49. Thus, when the switch 99–I is closed, the motor 90 will be continuously energized to drive the machine at slow-speed for so long as the control handle 7 remains in position B, the automatic means for quickly deenergizing the coil 57 thus being rendered ineffective.

I claim:

1. In combination with a machine to be driven, driving means, an element shiftable between a first position in which said driving means is rendered ineffective to drive said machine and a second position in which said driving means is rendered effective to drive said machine, said element being biased to one of said positions, a relay dominating said element and effective, when energized, to shift said element to the other of said positions, and an energizing circuit for said relay including a source of electrical energy, a switch having a normal position in which it is open and an abnormal position in which it is closed, and a switch having a normal position in which it is closed and an abnormal position in which it is open, means for shifting one of said switches to its said abnormal position at the will of an operator, electromagnetic means effective, when energized, to shift the other of said switches to its said abnormal position, an energizing circuit for said electro-magnetic means, and switch means in said last-named circuit dominated by said relay and effective to close said last-named circuit upon energization of said relay.

2. In combination with a machine to be driven, driving means, an element shiftable between a first position in which said driving means is rendered ineffective to drive said machine and a second position in which said driving means is rendered effective to drive said machine, said element being biased to its first position, a relay dominating said element and effective, when energized, to shift said element to its second position, and an energizing circuit for said relay including a source of electrical energy, a normally-open switch and a normally-closed switch, means for closing said normally-open switch at the will of an operator, electro-magnetic means effective, when energized, to open said normally-closed switch, an energizing circuit for said electro-magnetic means, and switch means in said last-named circuit dominated by said relay and effective to close said last-named circuit upon energization of said relay.

3. In combination with a machine to be driven, an electric motor connected to drive said machine, an energizing circuit for said motor, switch means dominating said circuit and biased to circuit-open condition, relay means dominating said switch means and effective, when energized, to hold said switch means in circuit-closing condition, an energizing circuit for said relay including a normally-closed switch and a normally-open switch, means for closing said normally-open switch at the will of an operator, electro-magnetic means effective, upon energization, to open said normally-closed switch, an energizing circuit for said electro-magnetic means, and a switch in said last-named energizing circuit dominated by said relay and effective to close said last-named energizing circuit upon energization of said relay.

4. The combination of claim 1 including a further switch effective, when closed, to establish an energizing circuit for said relay by-passing said normally-closed switch and said last-named switch means.

5. The combination of claim 3 including a further switch effective, when closed, to establish an energizing circuit for said relay by-passing said normally-closed switch and said last-named switch.

References Cited in the file of this patent

UNITED STATES PATENTS

| | | |
|---|---|---|
| 1,775,730 | McNicol | Sept. 16, 1930 |
| 2,290,198 | More | July 21, 1942 |
| 2,416,181 | King | Feb. 8, 1947 |
| 2,686,895 | Feldhausen | Aug. 17, 1954 |